(12) United States Patent
Block et al.

(10) Patent No.: US 10,060,747 B2
(45) Date of Patent: Aug. 28, 2018

(54) SYSTEM AND METHOD FOR AIRCRAFT OPERATIONS INCLUDING PATH GUIDANCE PANEL WITH CONDITIONAL WAYPOINTS

(71) Applicants: Sandel Avionics, Inc., Vista, CA (US); Priscilla Hickey

(72) Inventors: Gerald J. Block, Vista, CA (US); Jim Slattery, San Diego, CA (US); Robert J. Bleeg, Mercer Island, WA (US); Delmar M. Fadden, Preston, WA (US); Richard W. Taylor, Seattle, WA (US)

(73) Assignee: SANDEL AVIONICS INC., Vista, CA (US)

( * ) Notice: Subject to any disclaimer, the term of this patent is extended or adjusted under 35 U.S.C. 154(b) by 0 days.

(21) Appl. No.: 15/354,805

(22) Filed: Nov. 17, 2016

(65) Prior Publication Data

US 2017/0138739 A1   May 18, 2017

Related U.S. Application Data

(60) Provisional application No. 62/256,229, filed on Nov. 17, 2015, provisional application No. 62/256,224, (Continued)

(51) Int. Cl.
*G01C 23/00* (2006.01)
*B64C 13/18* (2006.01)
(Continued)

(52) U.S. Cl.
CPC ............. *G01C 21/20* (2013.01); *B64D 43/00* (2013.01); *G01C 23/00* (2013.01)

(58) Field of Classification Search
CPC ...... G01C 23/00; G01C 21/20; G01C 23/005; G01C 21/05; B64C 13/04; B64C 13/18; G01H 17/00; B64D 43/00; G06F 3/14
See application file for complete search history.

(56) References Cited

U.S. PATENT DOCUMENTS 6,320,579 B1 * 11/2001 Snyder ............... G01C 23/005
345/419
9,096,309 B2 * 8/2015 Puyou ................. G05D 1/0808
(Continued)

OTHER PUBLICATIONS

International Search Report and Written Opinion dated Mar. 2, 2017 issued in connection with corresponding International Application No. PCT/US16/62593 (7 pages total).

*Primary Examiner* — Yuri Kan
(74) *Attorney, Agent, or Firm* — Stuart H. Mayer; Mayer & Williams PC

(57) ABSTRACT

A flight management system for controlling navigation of an aircraft includes a path guidance panel having at least one mode selector for allowing user selection of guidance mode in which the aircraft is to operate. The system also includes at least one display device having rendered thereon a navigational map. A computer module receives aircraft data from one or more aircraft components, at least one of the aircraft components being a guidance system. The computer module is configured to use information obtained from the guidance system to cause the display device to render on the navigational map a current flight plan path that is the aircraft is following.

1 Claim, 20 Drawing Sheets

Related U.S. Application Data filed on Nov. 17, 2015, provisional application No. 62/256,496, filed on Nov. 17, 2015.

(51) Int. Cl.
*G01C 21/20* (2006.01)
*B64D 43/00* (2006.01)

(56) References Cited

U.S. PATENT DOCUMENTS

| | | | |
|---|---|---|---|
| 9,360,866 B2* | 6/2016 | Gutierrez-Castaneda | B64C 13/18 |
| 9,493,249 B2* | 11/2016 | Shukla | G01H 17/00 |
| 9,725,157 B2* | 8/2017 | Albert | B64C 13/04 |
| 2008/0046171 A1* | 2/2008 | Bitar | G01C 21/20 |
| | | | 701/14 |
| 2011/0130897 A1* | 6/2011 | Gladysz, Jr. | B64D 43/00 |
| | | | 701/15 |
| 2012/0022778 A1 | 1/2012 | Mishra | |
| 2012/0035842 A1* | 2/2012 | Shafaat | G01C 23/005 |
| | | | 701/120 |
| 2014/0081485 A1 | 3/2014 | Wilson et al. | |
| 2016/0264254 A1 | 9/2016 | Jajur et al. | |
| 2016/0357488 A1* | 12/2016 | Albert | G06F 3/14 |

* cited by examiner

| CONTROL OPS | SCENARIO | ACTION # | APFD | PILOT ACTION |
|---|---|---|---|---|
| | STEADY STATE FLIGHT WITH NO APFD MODES OR FUNCTIONS SELECTED. THIS IS THE NORMAL BACKGROUND FOR ALL LGS DISPLAYS. | 0 | OFF | NONE |
| | PRESET A DIRECTION WITH A TOTAL TURN LESS THAN 180° FROM PRESENT HEADING | 1a | OFF OR LNAV ENGAGED | TURN DIR KNOB CLOCKWISE TO 040° |
| | PRESET A DIRECTION WITH A TOTAL TURN GREATER THAN 180° FROM PRESENT HEADING. THIS IS UNDERSTOOD TO BE AN INTENTIONAL TURN IN THE LONG TURN DIRECTION. | 1b | OFF OR LNAV ENGAGED | TURN DIR KNOB COUNTER-CLOCKWISE TO 040° |
| | TURN TO A PRESET HDG AS WHEN BEING VECTORED BY ATC. | 1c | OFF OR LNAV ENGAGED | PRESS HDG BUTTON |
| | TURN TO A PRESET TRK AS WHEN PILOT IS MANEUVERING WITH RESPECT TO AN OBJECT ON THE GROUND. | 1d | OFF OR LNAV ENGAGED | PRESS TRK BUTTON |
| | CHANGE HDG TO 360° AS WHEN BEING VECTORED BY ATC. | 2a | ANY; REFER TO ACTION 1C IF HEADING PRESET IS ACTIVE. | PRESS HDG BUTTON. |
| | | 2b | PGP HDG | TURN DIR KNOB. |

FIG. 7

| | | |
|---|---|---|
| | LATERAL GUIDANCE SCREEN SHOWS | |
| | BASIC DATA:<br>1. ORIENTATION IS ALWAYS TRACK UP.<br>2. AIRPLANE SYMBOL, LOWER CENTER, WHITE<br>3. TIME RING, ONE RING 1/3 TO 1/2 SCREEN RANGE, SECOND RING AT TWICE THE TIME UNLESS SCREEN IS CLUTTERED.<br>3. FLIGHT PLAN LINE, IF IN RANGE.<br>4. FLIGHT PLAN WAYPOINTS WITH NAMES, IF IN RANGE.<br>5. SELECTED VORS, IF IN RANGE.<br>6. AIRPORTS (DEP, DES, ALT, SELECTED), IF IN RANGE. | |
| | THE DIR VALUE IS DISPLAYED IN GREEN NUMBERS AT THE LOWER RIGHT CORNER OF THE SCREEN. A REFERENCE GREEN LINE SHOWS THE TRACK ANGLE CONSISTENT WITH THE REFERENCE HEADING AND THE CURRENT WIND. THE REFERENCE GREEN LINE STARTS AT THE AIRPLANE AND SHOWS THE ARC NECESSARY TO ACCOMPLISH THE TURN TO THE NEW TRACK VALUE. THE TEXT "PGP REF" IS DISPLAYED IN GREEN SHOWING THAT THE VALUE CAME FROM THE PGP. ARC TO THE RIGHT SHOWS WHAT GUIDANCE WOULD COMMAND IF HEADING OR TRACK WAS SELECTED. | |
| | THE DIR VALUE IS DISPLAYED IN GREEN NUMBERS AT THE LOWER RIGHT CORNER OF THE SCREEN. A REFERENCE GREEN LINE SHOWS THE TRACK ANGLE CONSISTENT WITH THE SELECTED HEADING AND THE CURRENT WIND. THE REFERENCE GREEN LINE STARTS AT THE AIRPLANE AND SHOWS ARC NECESSARY TO ACCOMPLISH THE TURN TO THE NEW TRACK VALUE IN THE DIRECTION INDICATED BY THE TURN KNOB ROTATION. THE TEXT "PGP REF" IS DISPLAYED IN GREEN.<br>ARC TO THE LEFT SHOWS WHAT GUIDANCE WOULD DO IF THE HEADING OR TRACK MODE WAS SELECTED. | |
| | THE PREVIOUSLY GREEN REFERENCE LINE BECOMES SOLID MAGENTA WITH AN ARROW HEAD INDICATING A TRACK BASED ON A HEADING. "PGP HDG" IS DISPLAYED IN MAGENTA. PRESET REFERENCE VALUE COLOR CHANGES TO MAGENTA. | |
| | THE PRESET VALUE IS NOW TREATED AS A TRACK ANGLE AND THEREFORE SHIFTS AS NECESSARY TO SHOW THE TRACK AT THE REFERENCE ANGLE. "PGP TRK" IS DISPLAYED AT THE LOWER LEFT OF THE SCREEN. THE PRESET VALUE COLOR CHANGES TO MAGENTA. THE SOLID PRESET TRACK LINE WITH THE APPROPRIATE INITIAL CURVATURE TO COMPLETE THE TURN BECOMES A SOLID MAGENTA LINE STRETCHING TO THE EDGE OF THE SCREEN. | |
| | THE CURRENT "DIRECTION" VALUE IS SYNCED TO THE CURRENT HEADING AND THE NUMERIC VALUE DISPLAYED AT THE LOWER RIGHT CORNER. A SOLID MAGENTA LINE TERMINATING IN AN ARROW HEAD APPEARS AT THE TRACK ANGLE CONSISTENT WITH THE CURRENT HEADING. "PGP HDG" IS DISPLAYED IN MAGENTA AT THE LOWER LEFT OF THE SCREEN. | |
| | THE SOLID MAGENTA PREDICTED TRACK LINE ROTATES TO FOLLOW THE HEADING ANGLE. "PGP HDG" REMAINS DISPLAYED IN MAGENTA. THE PGP HEADING ANGLE NUMERIC VALUE IS INCREMENTED BY THE DIRECTION ANGLE CHANGE. A CIRCLE SEGMENT IS ADDED AT THE AIRPLANE END OF THE PREDICTED TRACK LINE AS THE DIFFERENCE BETWEEN CURRENT HEADING AND PGP TARGET HEADING CHANGES AWAY FROM ZERO. | |

*FIG. 7 Continued*

| | LGS RANGE | |
|---|---|---|
| | IF NEXT FLIGHT PLAN WAYPOINT IS WITHIN 200 NM IN FRONT OF THE AIRPLANE, SELECT A RANGE TO POSITION THAT WAYPOINT ON THE SCREEN. OTHERWISE, SET RANGE TO 15 NM OR GROUNDSPEED/10, WHICHEVER IS GREATER. A SEMICIRCLE IS SHOWN AHEAD OF THE AIRPLANE TO PROVIDE A GRAPHIC SENSE OF THE RANGE IN TERMS OF TIME. THE TIME VALUE SHOWN AT THE LOWER END OF THE TIME SEMICIRCLE. THE SEMICIRCLE IS FORCED TO CONVENIENT TIME UNITS. | |
| | | |
| | | |
| | | |
| | | |
| | | |

*FIG. 7 Continued*

| SUBSEQUENT AIRPLANE OPERATION | SCREEN GRAPHIC |
|---|---|
| | TCM, Δ 15 MIN, 30 MIN |
| NO CHANGE | HDG 040°, Δ 2 MIN, TRK 038° |
| NO CHANGE | HDG 040°, Δ 2 MIN, TRK 038° |
| AIRPLANE TURNS SO THAT THE ACTUAL HEADING VALUE MATCHES THE PRESET VALUE. PICTURE SHOWS THE TURN ABOUT HALF WAY COMPLETE. | PGP HDG 040°, Δ 3 MIN |
| AIRPLANE TURNS AS NECESSARY SO THAT THE ACTUAL TRACK ANGLE VALUE MATCHES THE PRESET VALUE. PICTURE SHOWS THE TURN COMPLETE. | Δ 3 MIN, PGP TRK 038° |
| APFD SWITCHES TO HEADING SELECT MODE AND SYNCS DIRECTION CONTROL TO CURRENT HEADING. NO AIRPLANE MANEUVERING EXCEPT THAT REQUIRED TO HOLD THE HEADING. | PGP HDG 027°, Δ 2 MIN |
| AIRPLANE TURNS SO THAT THE ACTUAL HEADING VALUE MATCHES THE NEWLY SELECTED VALUE. | PGP HDG 360°, Δ 2 MIN |

*FIG. 7 Continued*

| COMMENTS |
|---|
| |
| THE GREEN SOLID TRACK LINE IS CONSTRUCTED OF AN INITIAL CURVED SEGMENT AND A STRAIGHT SEGMENT. THE STRAIGHT SEGMENT IS ORIENTED AT THE TRACK ANGLE CONSISTENT WITH TREATING THE REFERENCE VALUE AS A HEADING AND THE EXISTING WIND. THE CURVED PORTION IS A CONSTANTS TAS, STILL AIR, CIRCLE BASED ON A TURN AT AN APFD SUPPLIED BANK ANGLE, STRETCHED IN THE DIRECTION OF THE WIND BY THE WIND VECTOR EXISTING BEFORE ANY MANEUVERING IS INITIATED. (FREEZING THE WIND VECTOR AVOIDS THE NOISE IN THE WIND VECTOR CALCULATION THAT WILL OCCUR DURING TURNING FLIGHT.) THE STRAIGHT SEGMENT ATTACHES TO THE CIRCULAR PORTION AT THE POINT WHERE THE TANGENT TO THE CIRCLE IS EQUAL TO THE PREDICTED TRACK ANGLE. THE COMBINATION OF STRETCHED CIRCLE AND STRAIGHT LINE REMAINS ATTACHED TO THE AIRPLANE PRESENT POSITION AND ORIENTATION. IT IS NOT FIXED TO THE EARTH'S SURFACE. WHEN THE HEADING ERROR IS LESS THAN 30°, THE CIRCLE SEGMENT MAY BE BE CONSTRUCTED USING CURRENT GROUNDSPEED IN PLACE OF TAS AND IGNORING THE WIND. CONSIDER ADDING A PILOT SPECIFIC OPTION THAT WOULD TREAT THE PGP REF VALUE AS A TRACK ANGLE RATHER THAN A HEADING. |
| SAME AS ABOVE |
| CONSTRUCTION OF THE MAGENTA LINE IS THE SAME AS DESCRIBED FOR 1A. |
| THE SOLID MAGENTA TRACK LINE IS CONSTRUCTED OF AN INITIAL CURVED SEGMENT AND A STRAIGHT SEGMENT. THE STRAIGHT SEGMENT IS ORIENTED AT THE REFERENCE TRACK ANGLE. THE CURVED PORTION IS A CONSTANTS TAS, STILL AIR, CIRCLE BASED ON A TURN AT AN APFD SUPPLIED BANK ANGLE, STRETCHED IN THE DIRECTION OF THE WIND BY THE WIND VECTOR EXISTING BEFORE ANY MANEUVERING IS INITIATED. (FREEZING THE WIND VECTOR AVOIDS THE NOISE IN THE WIND VECTOR CALCULATION THAT WILL OCCUR DURING TURNING FLIGHT.) THE STRAIGHT SEGMENT ATTACHES TO THE CIRCULAR PORTION AT THE POINT WHERE THE TANGENT TO THE CIRCLE IS EQUAL TO THE REFERENCE TRACK ANGLE. THE COMBINATION OF STRETCHED CIRCLE AND STRAIGHT LINE REMAINS ATTACHED TO THE AIRPLANE PRESENT POSITION AND ORIENTATION. IT IS NOT FIXED TO THE EARTH'S SURFACE. WHEN THE TRACK ERROR IS LESS THAN 30°, THE CIRCLE SEGMENT MAY BE BE CONSTRUCTED USING CURRENT GROUNDSPEED IN PLACE OF TAS AND IGNORING THE WIND. |
| THERE IS NO CIRCLE SEGMENT SINCE THE HEADING ERROR IS ZERO OR NEAR ZERO AND NO TURN IS REQUIRED. |
| IT IS NOT NECESSARY TO COMPUTE THE CIRCLE SEGMENT FOR SMALL HEADING ANGLE ERRORS. |

*FIG. 7 Continued*

| CONTROL OPS | SCENARIO | ACTION # | APFD | PILOT ACTION |
|---|---|---|---|---|
| | CHANGE TRK TO 030° | 3a | ANY; REFER TO ACTION 1D IF PRESET IS ACTIVE. | PRESS TRK BUTTON. |
| | | 3b | PGP TRK | TURN DIR KNOB. |
| | TURN TO AN ATC SPECIFIED 050° HEADING TO INTERCEPT THE FLIGHTPLAN AS WHEN ATC ISSUES A CLEARANCE TO FLY A VECTOR TO INTERCEPT AN EXISTING ASSIGNED ROUTE. | 4a1 | PGP HDG | TURN TO THE CLEARED HDG USING EITHER THE "TURN TO A PRESET HDG" OR THE "CHANGE HDG" ACTIONS. 1C OR 2A-B ABOVE. |
| | | 4a2 | PGP HDG | SAME AS ABOVE BUT WITH A 010° HEADING. |
| | | 4b | PGP HDG | PRESS LNAV |
| | | 4c1 | PGP HDG | PRESS LNAV |

FIG. 8

| LATERAL GUIDANCE SCREEN SHOWS |
|---|
| A SOLID MAGENTA TRACK LINE APPEARS AT CURRENT TRACK ANGLE. "PGP TRK" IS DISPLAYED IN MAGENTA. THE CURRENT "DIRECTION" VALUE IS SYNCED TO CURRENT TRACK ANGLE AND THE NUMERIC VALUE DISPLAYED IN THE LOWER RIGHT CORNER OF THE SCREEN. |
| THE SOLID MAGENTA TARGET TRACK LINE ROTATES TO FOLLOW THE DIRECTION ANGLE. "PGP TRK" REMAINS DISPLAYED IN MAGENTA. THE TRACK ANGLE NUMERIC VALUE IS INCREMENTED BY THE DIRECTION ANGLE CHANGE. A CIRCLE SEGMENT IS ADDED AT THE AIRPLANE END OF THE TARGET TRACK LINE AS THE DIFFERENCE BETWEEN CURRENT TRACK AND PGP TRACK ANGLE CHANGES AWAY FROM ZERO. |
| THE FLIGHT PLAN LINE MAY OR MAY NOT BE VISIBLE ON THIS SCREEN. THIS PICTURE SHOWS FLIGHT PLAN PATH WITHIN THE SCREEN RANGE AND TO RIGHT OF THE AIRPLANE. THE PREDICTED TRACK LINE ASSOCIATED WITH THE CLEARED HEADING DOES CROSS THE FLIGHT PLAN LINE SO A PRACTICAL INTERCEPT EXISTS. SCREEN RANGE PERMITTING THE NECESSARY TURNING CIRCLE SEGMENT IS ADDED AT THE AIRPLANE END OF MAGENTA TRACK LINE. |
| HAD THE CLEARED HEADING BEEN 010° THE RESULTING TRACK ANGLE WOULD NOT HAVE INTERCEPTED THE FLIGHT PLAN. |
| THE PGP HDG VALUE REMAINS DISPLAYED.IF THE PROBABLE TRACK RESULTING FROM THE SELECTED HEADING DOES NOT INTERCEPT THE FLIGHT PLAN (AS IN 4A2): PGP HDG ANNUNCIATION REMAINS UNCHANGED. A NOMINAL HEADING TO INTERCEPT IS ANNUNCIATED IN YELLOW.LNAV ARM IS DISPLAYED ON THE PFD FLIGHT MODE ANNUNCIATOR.PILOT CAN CANCEL THE INTERCEPT ANNUNCIATION BY CHANGING THE PGP HEADING TO ANY VALUE THAT DOES CREATE AN INTERCEPT (SEE 4C1 BELOW). THE PILOT CAN CANCEL THE ANNUNCIATION AND LNAV ARM BY SELECTING UNDO. |
| IF THE PROBABLE TRACK RESULTING FROM THE SELECTED HEADING DOES INTERCEPT THE FLIGHT PLAN, LNAV IS ACTIVATED AND THE ANNUNCIATION IN THE LOWER LEFT CORNER BECOMES "PGP HDG TO FPLAN". THE ACTIVE FLIGHT PLAN LEG BECOMES A HEADING SEGMENT FROM PRESENT POSTION. THE HEADING SEGMENT TERMINATES AT THE FLIGHT PLAN LINE AND THE NEXT LEG WILL BE THE FLIGHT PLAN LEG TO TCM. A CONDITIONAL WAYPOINT (DIAMOND SYMBOL) MARKS THE APPROXIMATE LOCATION OF THE INTERCEPT. THE PREDICTED TRACK CONSISTENT WITH THE PGP HDG VALUE IS SHOWN AS A BOLD MAGENTA LINE TERMINATED WITH AN ARROW HEAD CLOSE TO, BUT NOT TOUCHING, THE DIAMOND. THE FLIGHT PLAN LINE FOLLOWING THE CONDITIONAL WAYPOINT BECOMES BOLD DOTTED MAGENTA. THESE LINES MAKE IT CLEAR THAT GUIDANCE WILL TRANSITION TO THE FLIGHT PLAN AT THE CONDITIONAL WAYPOINT. HDG SEL REMAINS DISPLAYED AS DOES THE CYAN FLIGHT PLAN LINE LEADING TO THE CONDITIONAL WAYPOINT TO REMIND THE PILOT THAT: 1) GUIDANCE IS CONTROLLING TO THE SPECIFIED HEADING AND 2) THE CONDITIONAL WAYPOINT CAN BE ADJUSTED BY CHANGING THE PGP HEADING VALUE. |

*FIG. 8 Continued*

| LGS RANGE | SUBSEQUENT AIRPLANE OPERATION |
|---|---|
| | APFD SWITCHES TO TRACK SELECT MODE AND SYNCS DIRECTION CONTROL TO CURRENT TRACK ANGLE. NO AIRPLANE MANEUVERING EXCEPT THAT REQUIRED TO HOLD THE TRACK ANGLE. |
| SCREEN RANGE REMAINS 200 NM | AIRPLANE TURNS SO THAT THE ACTUAL TRACK ANGLE VALUE MATCHES THE NEWLY SELECTED VALUE |
| SCREEN RANGE ADJUSTS TO SHOW NEXT WAYPOINT AT 18% BELOW TOP EDGE OF SCREEN BUT NOT MORE THAN 200 NM. | AIRPLANE TURNS TO AND HOLDS THE HEADING SELECT ANGLE. |
| | AIRPLANE TURNS TO AND HOLDS THE HEADING SELECT ANGLE. |
| LGS RANGES AS NECESSARY TO ENSURE FLIGHT PLAN INTERCEPT POSITION IS SHOWN WELL WITHIN THE PERIPHERY OF THE SCREEN. IN THE INTERCEPT CASE THE RANGE COULD BE WELL IN EXCESS OF 200 NM. IT IS PRESUMED THAT THE PILOT WILL ELECT TO MONITOR LONG DISTANCE INTERCEPTS USING THE HSD OR THE PAN AND ZOOM CAPABILITY OF THE MFD MAP. | AIRPLANE TURNS TO AND HOLDS THE HEADING SELECT ANGLE. |
| LGS RANGES AS NECESSARY TO ENSURE FLIGHT PLAN INTERCEPT POSITION IS SHOWN. | GUIDANCE CHANGED TO LNAV WHEN LNAV WAS SELECTED. THE CURRENT LEG IS A PILOT SELECTED HEADING LEG WITH A FIXED TERMINATION LINE. THE LOCATION OF THE CONDITIONAL POINT WILL SHIFT ALONG THE FLIGHT PLAN LINE AS THE RESULT OF ANY CHANGES IN DRIFT ANGLE THAT OCCUR WHILE THE AIRPLANE IS ON THE HEADING LEG. |

*FIG. 8 Continued*

| SCREEN GRAPHIC | COMMENTS |
|---|---|
| (4 MIN, PGP TRK 047°) | |
| (4 MIN, PGP TRK 030°) | IT IS NOT NECESSARY TO COMPUTE THE CIRCLE SEGMENT FOR SMALL TRACK ANGLE ERRORS. |
| (TCM, PGP HDG 050°, 10 MIN) | |
| (TCM, PGP HDG 010°, 10 MIN) | |
| (TCM, FOR INTERCEPT TURN RT, PGP HDG 010°, 10 MIN) | |
| (TCM, HDG, TO FPLAN, PGP HDG 050°, 10 MIN) | THE ARROW HEAD SHOULD TERMINATE A CONSTANT SCREEN DISTANCE BEFORE REACHING THE DIAMOND SYMBOL REGARDLESS OF THE LGS RANGE VALUE. |

*FIG. 8 Continued*

| CONTROL OPS | SCENARIO | ACTION # | APFD | PILOT ACTION |
|---|---|---|---|---|
| | ATC ISSUES A NEW VECTOR BEFORE THE AIRPLANE REACHES THE CONDITIONAL WAYPOINT. | 4c2 | LNAV WITH PGP HDG | ADJUST THE DIR KNOB TO REFLECT THE NEW HEADING VALUE. |
| WHEN THE CONDITIONAL WAYPOINT IS REACHED: | | 4d | LNAV | NONE |
| | NEXT LEG OF THE FLIGHT PLAN IS A HEADING LEG, AS MIGHT BE TRUE FOR THE LAST LEG OF A STAR. | 5a | LNAV | NONE |
| | ON A FLIGHT PLAN HEADING LEG. | 5b | LNAV | NONE |
| | ON A FLIGHT PLAN HEADING LEG APPROACHING THE DESTINATION RUNWAY CENTERLINE. | 5c | LNAV | NONE |
| | ON A FLIGHT PLAN HEADING LEG WITH AN APPROACH PROCEDURE SELECTED BUT NO TRANSITION TO THE APPROACH PROCEDURE. | 5d | LNAV | NONE |
| | ON A FLIGHT PLAN HEADING LEG WITH AN APPROACH PROCEDURE SELECTED. ATC ISSUES A HEADING VECTOR TO INTERCEPT THE APPROACH PROCEDURE. | 5e | LNAV | SELECT THE ATC VECTOR VALUE USING THE PGP DIR KNOB. |

*FIG. 9*

| LATERAL GUIDANCE SCREEN SHOWS | LGS RANGE |
|---|---|
| AS THE KNOB IS TURNED IF THE TRACK RESULTING FROM THE NEW HEADING STILL INTERCEPTS THE ORIGINAL FLIGHT PLAN PATH, THE CONDITIONAL WAYPOINT SLIDES ALONG THE ORIGINAL FLIGHT PLAN LINE AS NECESSARY TO SHOW THE MODIFIED INTERCEPT POINT. THE GUIDANCE MODE IS NOT CHANGED SO LONG AS AN INTERCEPT POINT CAN BE CALCULATED. IF THE HEADING IS CHANGED SUCH THAT AN INTERCEPT DOES NOT EXIST, THE GUIDANCE MODE REVERTS TO LNAV ARM AND THE LGS REVERTS TO THE SCREEN SHOWN IN 4B ABOVE WITH A NEW RECOMMENDED INTERCEPT HEADING. | |
| THE PGP HDG ANNUNCIATION AND ASSOCIATED SELECTED HEADING VALUE ARE REMOVED. THE ANNUNCIATION IN THE LOWER LEFT CORNER NOW STATES FPLAN TO TCM. AS THE AIRPLANE PASSES THE INTERCEPT WAPOINT, THE FLIGHT PLAN SEGMENT FOLLOWING THE INTERCEPT POINT BECOMES SOLID MAGENTA. THE FLIGHT PLAN PATH PRIOR TO THE CONDITIONAL WAYPOINT AND THE CONDITIONAL WAYPOINT ITSELF BECOME GRAY. THE UNDO ANNUNCIATOR GOES OFF SINCE ALL OF THE PREVIOUS FLIGHT PLAN MODIFICATION HAVE BEEN COMPLETED AND FLOWN. | |
| THE LEG AFTER TCM IS DASHED INDICATING IT IS THE NEXT LEG. THE LEG HAS NO TERMINATOR AND ENDS WITH A HEADING ARROW. THE FLIGHT PLAN HEADING VALUE IS SHOWN AND THE ANGLE OF THE DASHED LINE IS ADJUSTED BY THE CALCULATED DRIFT ANGLE FOR THAT LEG. | |
| THE HEADING LEG IS NOW SOLID MAGENTA WITH A HEADING ARROW. IT ENDS SHORT OF THE EDGE OF THE SCREEN. THE FLIGHT PLAN HEADING VALUE IS SHOWN NEAR THE END OF THE HEADING LEG LINE. | |
| AS FOR 5B ABOVE. DESTINATION RUNWAY AND EXTENDED RUNWAY CENTERLINE DISPLAYED. | |
| SAME AS FOR 5C ABOVE. SELECTED APPROACH PROCEDURE IS SHOWN IN CYAN. THERE IS A BREAK IN THE FLIGHT PLAN DUE TO THE UNTERMINATED HEADING LEG THUS THE APPROACH PROCEDURE IS NOT MAGENTA. | |
| MOVING THE DIR KNOB SETS A PRESET HEADING OR TRACK VALUE AND THE POTENTIAL RESULTING PATH IS DEPICTED WITH THE NORMAL DASHED GREEN PRESET LINE | |

*FIG. 9 Continued*

| SUBSEQUENT AIRPLANE OPERATION | SCREEN GRAPHIC |
|---|---|
| THE AIRPLANE TURNS TO MAINTAIN THE NEWLY SELECTED HEADING | 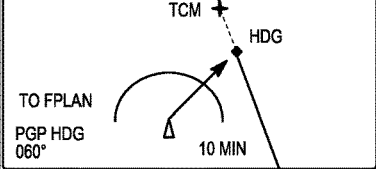 |
| AS THE AIRPLANE NEARS THE CONDITIONAL POINT A TURN IS INITIATED TO INTERCEPT THE NEXT PATH SEGMENT. PATH FOLLOWING SUBSEQUENT TO THE CONDITIONAL POINT IS SEEKS TO MINIMIZE THE PATH DEVIATION ERROR. | 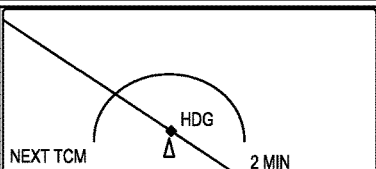 |
| | 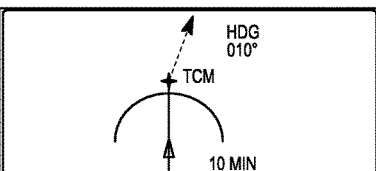 |
| GUIDANCE WILL CONTINUE TO COMMAND MAINTAINING THE HEADING UNTIL THE PILOT TAKES ACTION TO CHANGE THE LEG. | 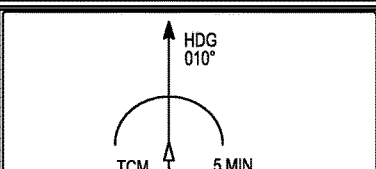 |
| GUIDANCE WILL CONTINUE TO COMMAND MAINTAINING THE HEADING UNTIL THE PILOT TAKES ACTION TO CHANGE THE LEG. | 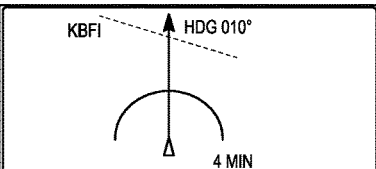 |
| GUIDANCE WILL CONTINUE TO COMMAND MAINTAINING THE HEADING UNTIL THE PILOT TAKES ACTION TO CHANGE THE LEG. | 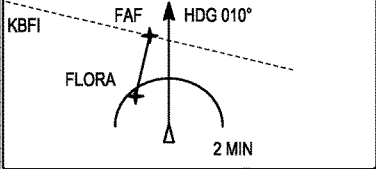 |
| GUIDANCE WILL CONTINUE TO COMMAND MAINTAINING THE HEADING UNTIL THE PILOT TAKES ACTION TO CHANGE THE LEG. | 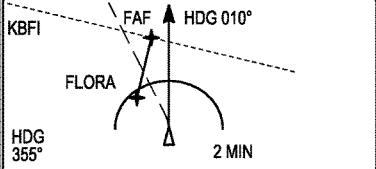 |

FIG. 9 Continued

| COMMENTS |
|---|
| THE NEXT LEG DOT SPACING AND SIZE SHOULD BE SELECTED TO ENSURE THAT LEG CAN BE READILY IDENTIFIED AT A GLANCE. |
| THE CURVED TRANSITION LINE IS ALWAYS COMPUTED SINCE IT IS USED BY THE GUIDANCE, BUT IT WILL NOT BE VISIBLE UNTIL THE LGS RANGE IS SHORT. |
| |
| |
| THE LEG AFTER TCM IS DASHED INDICATING IT IS THE NEXT LEG. THE LEG HAS NO TERMINATOR AND ENDS WITH A HEADING ARROW. THE FLIGHT PLAN HEADING VALUE IS SHOWN AND THE ANGLE OF THE DASHED LINE IS ADJUSTED BY THE CALCULATED DRIFT ANGLE FOR THAT LEG. |
| |

*FIG. 9 Continued*

| CONTROL OPS | SCENARIO | ACTION # | APFD | PILOT ACTION |
|---|---|---|---|---|
|  |  | 5f | LNAV | SELECT HDG MODE ON THE PGP |
|  |  | 5g | HDG | SELECT LNAV MODE ON PGP |

FIG. 10

| LATERAL GUIDANCE SCREEN SHOWS | LGS RANGE |
|---|---|
| THE PRESET HEADING BECOMES THE ACTIVE LEG.<br><br>THE SEQUENCE FOR 5E AND 5F IS NOT RESTRICTED. THE PILOT COULD HAVE DONE 5F FIRST AND THEN CHANGED THE DIR KNOB SETTING. | |
| THE CONDITIONAL WAYPOINT FOR THE APPROACH INTERCEPT POINT IS SHOWN USING THE PREDICTED TRACK DERIVED FROM THE SELECTED HEADING VALUE. AS WITH ALL HDG/TRK INTERCEPTS, THE DIR KNOB CAN BE USED TO ADJUST THE POSITION OF THE CONDITIONAL WAYPOINT.<br><br>SELECTION OF LNAV COULD HAVE BEEN DONE IMMEDIATELY AFTER SELECTING HDG OR DELAYED UNTIL ATC CLEARED THE AIRPLANE FOR THE INTERCEPT. | |

*FIG. 10 Continued*

SYSTEM AND METHOD FOR AIRCRAFT OPERATIONS INCLUDING PATH GUIDANCE PANEL WITH CONDITIONAL WAYPOINTS

CROSS-REFERENCE TO RELATED APPLICATIONS

This application claims benefit of priority of the following U.S. Provisional Patent Applications: Ser. No. 62/256,229, entitled "System And Method For Wake Up Power Control", filed Nov. 17, 2015; Ser. No. 62/256,224, entitled "System And Method For Audio Distribution", filed Nov. 17, 2015; and Ser. No. 62/256,496, entitled "System And Method For Path Guidance Panel With Conditional Waypoints", filed Nov. 17, 2015; all of which are incorporated by reference herein in their entirety.

FIELD

The invention relates generally to aircraft operations.

BACKGROUND

One of the most frequent complaints about current autopilot and flight management systems is confusion about what the automatic system is doing or what it is going to do. This is often expressed by the pilot as "What's it doing now!" The problem is exacerbated in the pilot's mind by the extensive list of tasks the automatic system could be doing. In general the pilot is expected to understand what the system is doing based on textual indications and annunciations and his or her knowledge of the system. Interpreting the system indications and annunciations often requires significant system knowledge.

Some current systems use graphics to show what the guidance system is currently doing, but do not make those graphic indications unique, nor do they show what the system will do next.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

In one aspect, systems and methods according to present principles provide display screens including graphics showing what the lateral and vertical guidance system is currently doing and what (if anything) it will do next. Furthermore, the screen(s) show qualitatively when the next action will occur.

Advantages of the invention may include one or more of the following. Systems and methods according to present principles may provide a convenient graphical display, incorporating integrated functionality. The same may enhance fuel efficiency and safety, as well as aircraft navigation. The same may further support future FAA flight-path-supported navigation. The simplicity of the displays according to present principles enhances the pilot's ability to see at a glance what the guidance system is doing. Systems and methods according to present principles provide unique simplicity—in contrast to other flight displays which show additional information to support other flight tasks, thereby leading to the confusion that has occurred in the past. Other advantages will be understood from the description that follows, including the figures.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIGS. 7-10 show tables presenting additional operational scenarios involving inflight guidance changes and the corresponding graphical information that may be displayed on the display screens of the PGP.

DETAILED DESCRIPTION

System and Method for Path Guidance Panel with Conditional Waypoints

Figure 1:
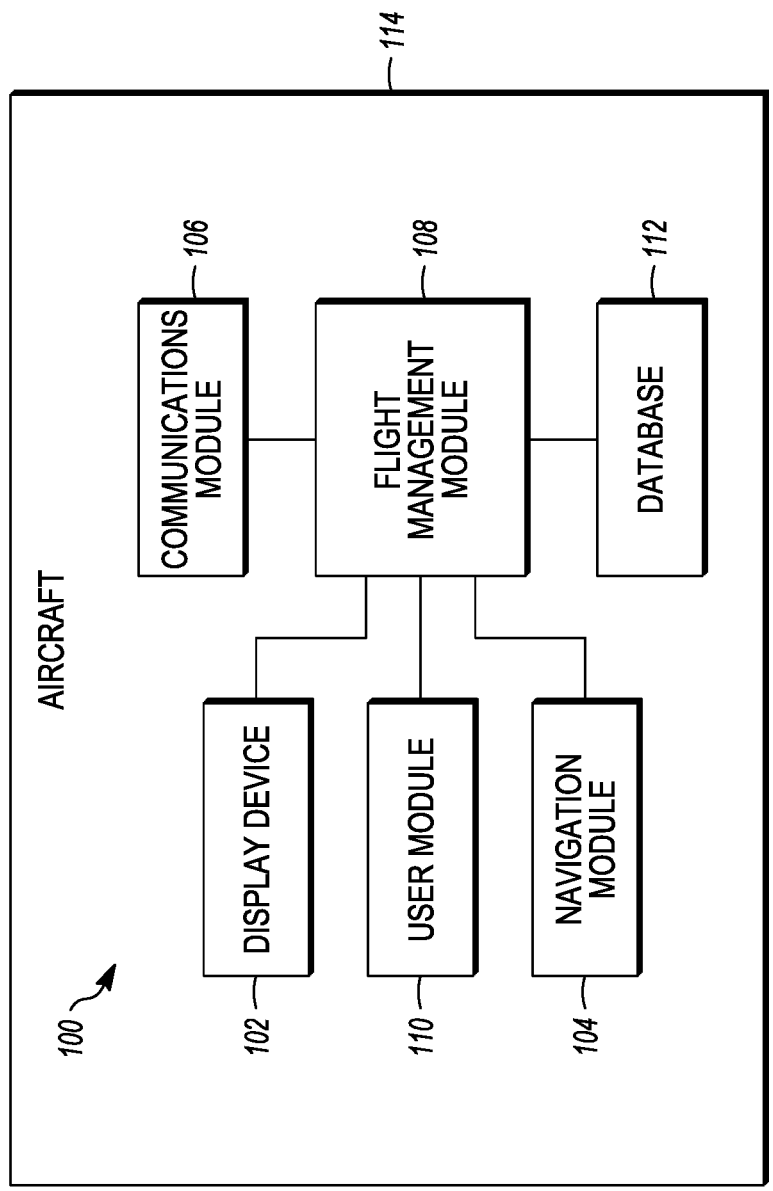
FIG. 1 shows one example of an autopilot function management system which may be located onboard an aircraft.

FIG. 1 shows one example of an autopilot function management system 100 which may be located onboard an aircraft 114. The autopilot function management system 100 may include, without limitation, a display device 102, a navigation or guidance module 104, a communications module 106, and a flight management module 108 (FMS). The autopilot function management system 100 further includes a user interface 110 for enabling interactivity with the autopilot function management system 100 and a database 112 suitably configured to support operation of the autopilot function management system 100. It should be understood that FIG. 1 is a simplified representation of a autopilot function management system 100 for purposes of explanation and ease of description, and FIG. 1 is not intended to limit the application or scope of the subject matter in any way. In practice, the autopilot function management system 100 and/or aircraft 114 will include numerous other devices and components for providing additional functions and features, as will be appreciated in the art.

In an exemplary embodiment, the display device 102 is coupled to the flight management module 108, and the flight management module 108 is configured to display, render, or otherwise convey one or more graphical representations or images associated with operation of the aircraft 114 on the display device 102, as described in greater detail below. The flight management module 108 is coupled to the navigation or guidance module 104 for obtaining real-time data and/or information regarding operation of the aircraft 114 to support operation of the flight management module 108, as will be appreciated in the art. In one embodiment, the user interface 110 is coupled to the flight management module 108, and the user interface 110 and the flight management module 108 are configured to allow a user to interact with the display device 102 and other elements of autopilot function management system 100. The communications module 106 is coupled to the flight management module 108 and configured to support communications between the aircraft 114 and another aircraft or ground location (e.g., air traffic control), as will be appreciated in the art.

In an exemplary embodiment, the display device 102 is realized as an electronic display configured to graphically display flight information or other data associated with operation of the aircraft 114 under control of the flight management module 108. The display device 102 may be located within a cockpit of the aircraft 114. It will be appreciated that although FIG. 1 shows a single display device 102, in practice, additional display devices may be present onboard the aircraft 114. The user interface 110 may also be located within the cockpit of the aircraft 114 and adapted to allow a user (e.g., pilot, co-pilot, or crew member) to interact with the flight management module 108. In various embodiments, the user interface 110 may be realized as a keypad, touchpad, keyboard, mouse, touchscreen, joystick, microphone, or another suitable device adapted to receive input from a user. In an exemplary embodiment, the user interface 110 and flight management module 108 are cooperatively configured to enable a user to indicate, select, or otherwise manipulate one or more pop-up menus displayed on the display device 102, as described below.

The navigation or guidance module 104 is configured to obtain one or more navigational parameters associated with operation of the aircraft 114. The navigation or guidance module 104 may include a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation or guidance module 104. The navigation or guidance module 104 is capable of obtaining and/or determining the current location of the aircraft 114 (e.g., the latitude and longitude) and the heading of the aircraft 114 (i.e., the direction the aircraft is traveling in relative to some reference) and providing these navigational parameters to the flight management module 108.

Although FIG. 1 is a simplified representation of autopilot function management system 100, in practice, the flight management module 108 may be coupled to one or more additional modules or components as necessary to support navigation, flight planning, and other aircraft control functions in a conventional manner. In addition, the flight management module 108 may include or otherwise access a terrain database, navigational database, geopolitical database, or other information for rendering a navigational map or other content on the display device 102. In this regard, the navigational map may be based on one or more sectional charts, topographic maps, digital maps, or any other suitable commercial or military database or map, as will be appreciated in the art.

The flight management module 108 accesses or includes a database 112 that contains procedure information for a plurality of airports. As used herein, procedure information should be understood as a set of operating parameters or instructions associated with a particular action (e.g., landing, take off, taxiing) that may be undertaken by the aircraft 114 at a particular airport. In this regard, an airport should be understood as referring to a location suitable for landing (or arrival) and/or takeoff (or departure) of an aircraft, such as, for example, airports, runways, landing strips, and other suitable landing and/or departure locations. The database 112 maintains the association of the procedure information and the corresponding airport. In an exemplary embodiment, the procedure information maintained in the database 112 comprises instrument procedure information conventionally displayed on a published chart (or approach plate) for the airport. In this regard, the procedure information may comprise instrument approach procedures, standard terminal arrival routes, instrument departure procedures, standard instrument departure routes, obstacle departure procedures, or other suitable instrument procedure information. Although the subject matter is described below in the context of an instrument approach procedure for purposes of explanation, in practice, the subject matter is not intended to be limited to instrument approach procedure and may be implemented for instrument departure procedures and other procedures in a similar manner as described below.

Figure 2:
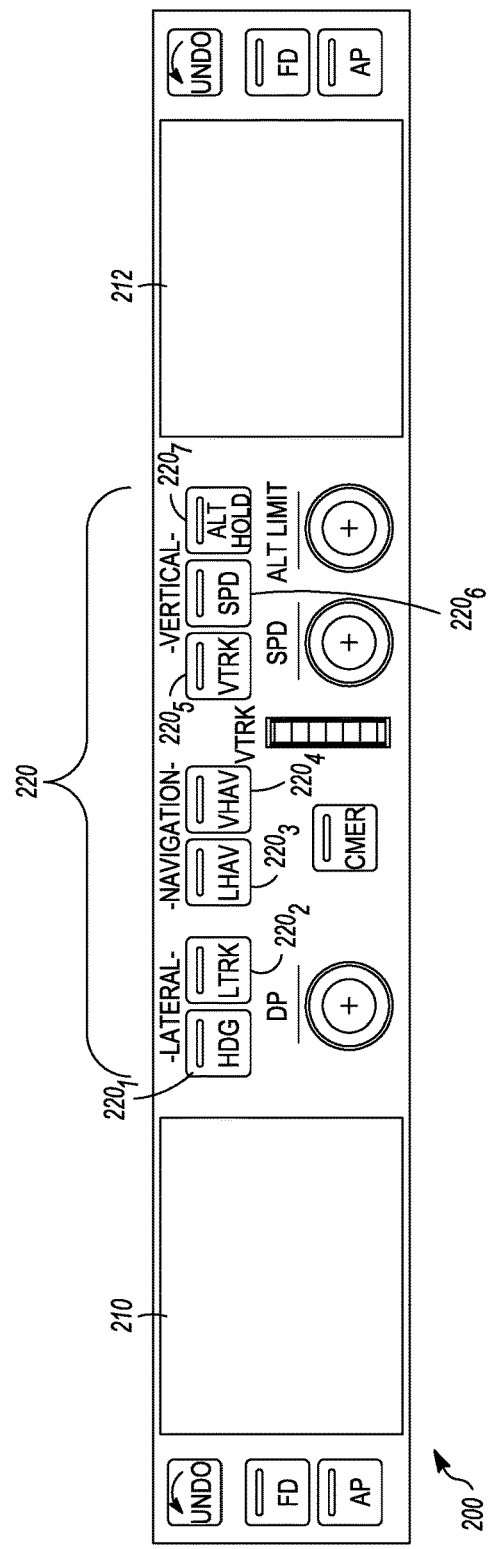
FIG. 2 shows one example of a path guidance panel (PGP).
Figure 3:
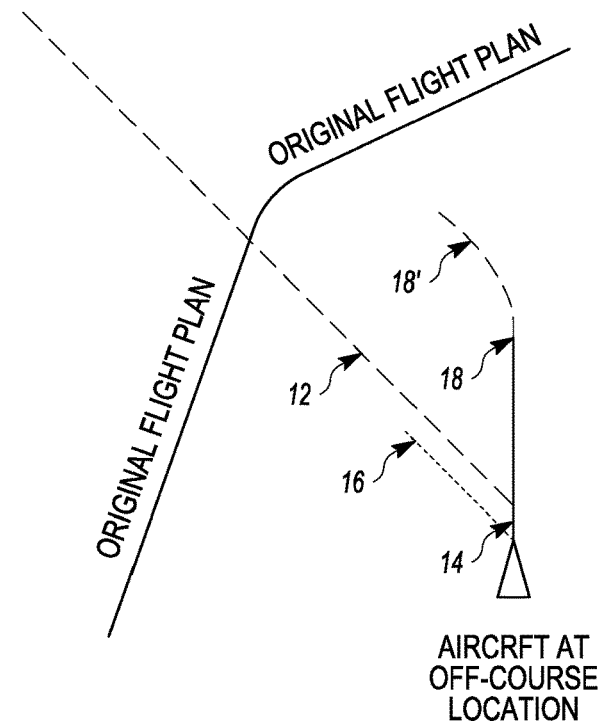
FIGS. 3-6 show examples of graphical information that may be presented on a display device of the PGP under various operational scenarios involving inflight guidance changes.

In accordance with systems and methods according to present principles, aspects of the functionality of autopilot function management system 100, particularly aspects of the functionality of the display device 102 and the user interface 102, may be provided in a path guidance panel (PGP) that is located in the cockpit of the aircraft. The path guidance panel provides a single location where guidance modes can be selected and tactical control of guidance can be accomplished. One example of the path guidance panel 200 is shown in FIG. 2.

The panel 200 includes one or more display devices to show the pilot what the guidance system is doing at the present time and what it is going to do next. In the particular embodiment shown in FIG. 2 the panel 200 includes two display devices 210 and 212, one of which presents lateral information and the other of which presents vertical information.

The path guidance panel 200 also includes one or more user inputs 220 that may be used to select and implement various guidance modes. For instance, in one embodiment one or more, or even all, of the following guidance modes may be supported:

1. HDG (Heading) mode selector $220_1$—selects a specific heading which will then be controlled by the autopilot or flight director;

2. LTRK or TRK (Lateral Track or Track) mode selector $220_2$—selects a specific track angle which will then be controlled by the autopilot or flight director;

3. LNAV (Lateral Navigation) mode selector $220_3$—allows autopilot or flight director control of flight along the defined lateral flight plan path;

4. VNAV (Vertical Navigation) mode selector $220_4$—allows autopilot or flight director control of flight along the defined vertical flight plan path or the defined vertical performance task;

5. VTRK or FPA (vertical track angle or flight path angle) mode selector $220_5$—selects a specific vertical flight path angle which will then be controlled by the autopilot or flight director;

6. SPD (speed or Mach) mode selector $220_6$—selects a specific speed or Mach number which will then be controlled by the autopilot or flight director through the pitch control system—this is commonly referred to as speed-on-elevator control;

7. ALT HOLD (altitude hold) mode selector $220_7$—terminates the current climb or descent and hold altitude.

When the aircraft is on the flight plan path and guidance is set to follow that path, the displays devices 210 and 220 will show a continuous line stretching out from the aircraft present position near the bottom center of the display. If the air traffic situation requires the aircraft to maneuver off the planned path temporarily, the heading or track related to the temporary maneuver will show as a continuous line stretching to the top of the display. The original flight plan path will be shown but will not be connected to the path resulting from the temporary maneuver. (The two lines may or may not cross.)

For example, as depicted in FIGS. 3-6, the aircraft has been flown away from the flight plan path. The distance that the aircraft is off path is depicted as the separation between the aircraft current position and the location of the flight plan path on the screen.

When the need for the temporary maneuver is satisfied the aircraft will be cleared to "intercept the flight plan path and resume own navigation." The pilot is assured that the guidance system is properly set for this maneuver when the intercept path terminates at a point where the current path crosses the original flight plan and the original flight plan segment beyond that crossing point shows on the screen as the "next" leg.

Scaling for the one or more display devices may be managed automatically to ensure that the pilot always or consistently has a clear graphic picture of any maneuvering well in advance of initiation of that maneuvering.

The active and next guidance mode along with pilot set leg value information (e.g., the selected HDG or the selected TRK in the case of a lateral maneuver; if the maneuver is vertical the pilot-set leg value would be the selected FPA or the selected SPD) may be presented on the display devices as well.

Thus, in certain implementations, the pilot may be enabled to accomplish most near term tactical plan changes entirely on the PGP 200.

All information present on the device displays of the PGP 210 may be also available on the primary flight displays (HSD, VFD, and VSD), although in most cases the primary displays can contain much more information.

The display devices on the PGP 200 may use, without limitation, one or more of the following data:
1. The active lateral and vertical guidance modes, including any reference values;
2. The active lateral and vertical flight plan with respect to the aircraft current position; and
3. Any planned interaction between the active guidance and the lateral or vertical flight plan.

The following figures illustrate various operations of the PGP 200.

In one implementation, systems and methods according to present principles relate to ways to use conditional waypoints to allow an aircraft to rejoin a flight plan or leg thereof. Referring to FIG. 1, an original flight plan is shown along with an aircraft, the aircraft being at an off course location. The pilot of the aircraft may wish to rejoin the original flight plan at a leg thereof. Alternatively, an ATC or other source may indicate that the aircraft is not on the flight plan, and may indicate that the aircraft should rejoin the same.

In systems and methods according to present principles, the pilot may "dial in" an initial heading to approximately fly in order to rejoin the flight plan, or a leg thereof, in a desired way. This is shown by a graphical element such as the dotted line 12 rendered on the display shown in FIG. 3. By turning a dial or another such user input mechanism to the left, the dotted line 12 may be shown as rotating counterclockwise. By turning the same user input mechanism to the right, the dotted line 12 may be made to rotate in a clockwise direction. In this way, the pilot may be enabled to turn the desired heading even greater than 180°, to allow complete control over how the aircraft rejoins the flight plan. As may be seen, the display may render a curved portion 14 which represents the actual path, i.e., a calculated path, as opposed to a non-calculated indication, that the aircraft will fly, as opposed to prior art displays which inaccurately show the aircraft adopting a heading instantaneously (see, e.g., the partial light line 16, which is drawn to illustrate prior art systems).

Figure 4:
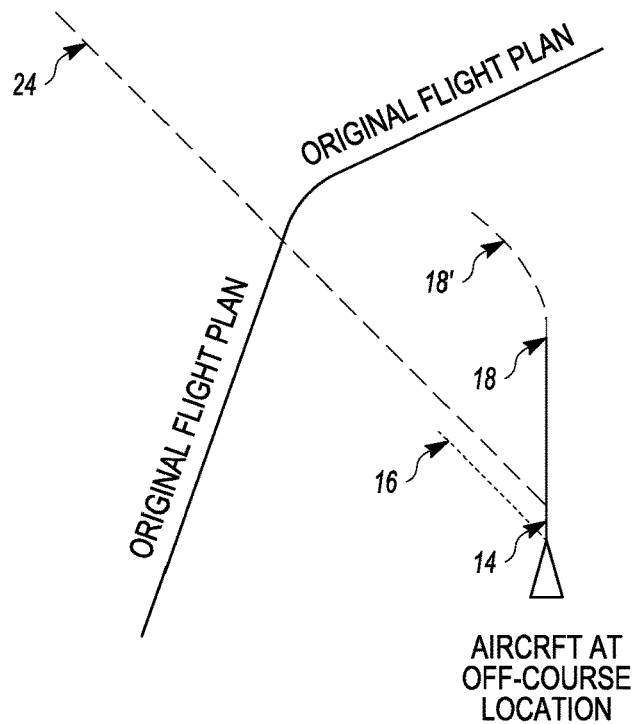

Once the pilot has "dialed in" the desired heading, he or she may user an input device (e.g., a button) to "lock" the heading into the system, at which point the dotted line 12 may change so that it is rendered as the solid line 24 shown in FIG. 4. The input device that is used may be, e.g., an LNAV button. In some implementations the line(s) rendered on the display may change color, e.g., for example, the dotted line may be green and the "locked in" line may be a solid magenta line. It is noted that there is no particular intercept with the flight plan in FIG. 4 and accordingly the line 24 is shown extending to "infinity".

Figure 5:
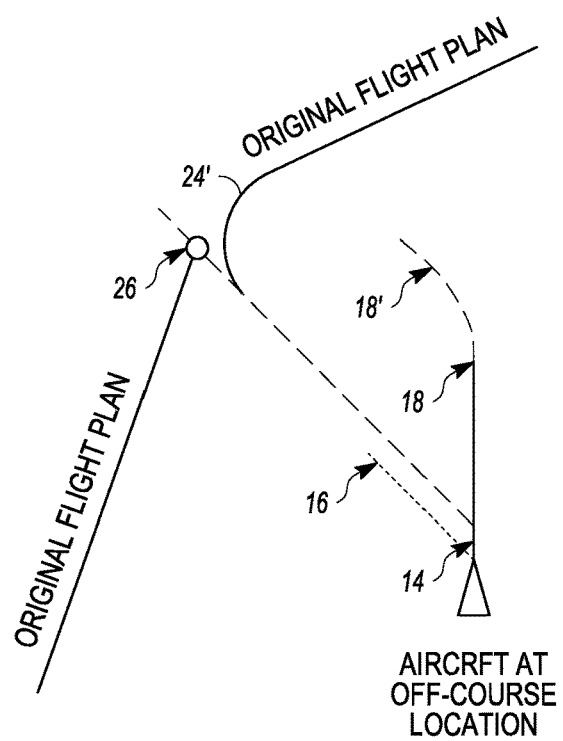
Figure 6:
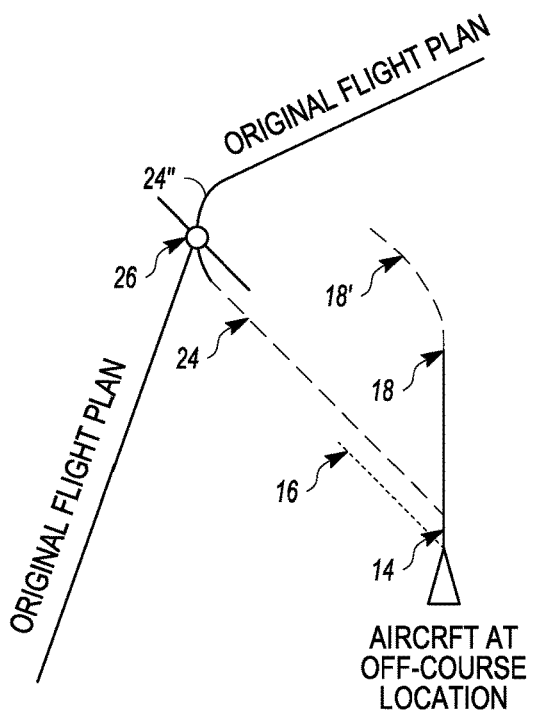

Upon selection or activation of an appropriate user input mechanism, e.g., upon another or subsequent depression of "LNAV", a solution may then be calculated and the line segment actually drawn to rejoin the path at an appropriately calculated location and using an appropriately calculated path, as indicated in FIG. 5. If the pilot follows the path immediately, the path shown following LNAV activation will be substantially that followed. However, if the pilot does not follow the path immediately, the path rendered on the display may be continually and dynamically updated to reflect the path required to be flown to rejoin at the desired location. At some point, it may be impossible to rejoin the path at the desired location given the flight abilities of the aircraft, and in this case the method and display may reset and the line 24 erased.

Assuming a solution is possible, then as further shown in FIG. 5 a conditional waypoint 26 is created and displayed on the original flight plan and the same used as part of a calculation, along with subsequent flight plan waypoints or other leg information if needed, in the creation of a solution path for the aircraft to fly, as indicated by the line segment 24'. Usually at least the leg information will be necessary.

Variations will be understood to one of ordinary skill in the art given this disclosure. For example, in one variation, while the description above has shown a dotted line, i.e., the potential heading line, emanating from the location of the aircraft, the same may also emanate from a future location of the aircraft, where the pilot plans to have the aircraft to rejoin the leg starting at a future time. See, e.g., line segments 18 and 18'. In general, the particular graphical elements illustrated in the figures to represent fight paths, etc., may be replaced with alternative graphical elements that are to be rendered on the display device(s) of the PGP 200.

While certain colors and graphical indications (dotted lines, solid lines, and so on) have been described above, and the same are considered to be of particular use to the pilot, it will be understood that variations of these may occur and be within the scope of the invention.

Depending on current conditions, including the geometry of the flight path and the current location and speed of the aircraft, legs may be rejoined by undershooting and gradually joining the desired leg, or by overshooting the desired flight path and then rejoining the leg. For an example of overshooting, line segment 24″ may be seen in FIG. 6.

In another variation, while the descriptions of FIGS. 1-4 illustrate a lateral situation, systems and methods according to present principles may be employed to allow rejoinder of vertical flight plans as well.

In some implementations, whether the state of operation is that of lines 12, 24, or 24', the pilot or other controller may be enabled to use an input mechanism to adjust the angle of the desired heading, to the left or the right. In this way, if the pilot is not satisfied with the intercept and/or suggested path and/or location of rejoining, the same may be changed, again giving the pilot complete control.

FIGS. 7-10 show tables presenting additional operational scenarios involving inflight guidance changes and the corresponding graphical information that may be displayed on the display screens of the PGP.

System and Method for Wake Up Power Control

In prior vehicle systems such as aircraft, determination of system status generally requires activation of main vehicle power. For example, for a pilot to determine how much fuel is in an aircraft, the aircraft has to be turned on.

In systems and methods according the present principles, a power control bus is employed, which supplies a small amount of power continuously to the aircraft from a battery source. The power control bus allows power and operation of a communications system, e.g., a wireless communication system. By accessing the communication system, e.g., via a remote application (running on a smartphone or tablet, for example) or other remote control, access may be had to aircraft systems.

The power control bus, or a different but connected power control bus, may also supply power to various components, and the applied power may be performed selectively, and system status or other actions performed by appropriate commands. In this way, the components may be temporarily powered up and system status polled and determined. For example, if the pilot wishes to know how much fuel was in the plane, he or she could determine such remotely, rather than having to enter the plane and turn on the same, as in the prior art. Following various actions, the control bus may then be employed to direct parts of the system to go back to "sleep" mode or the like.

Various modes may be employed as controlled by the power bus and the remote device, e.g., a low-power mode, a monitoring mode, and so.

In variations of systems and methods according to present principles, data need not only flow in one direction. Systems and methods according to present principles could be used to "wake up" the system so as to allow a software update. Such may be particularly pertinent with respect to various navigational databases that are often being updated. In this way, the component may be updated by remote uploading of a datafile, without the need to enter the aircraft or to power up the entire aircraft.

In another variation, systems and methods according to present principles may be used as an alarm. In this way, e.g., the system can wake itself up if a door is opened. Remote communications may also be employed to allow various levels of notifications, alerts, and alarms.

Remote links may be secured by various levels of encryption or other techniques, and the same may be performed by, e.g., Wi-Fi links, cellular links, or other such wireless links, including radiofrequency, microwave, Bluetooth® and infrared transmission.

System and Method for Audio Distribution

In prior vehicle audio systems such as those employed in aircraft cabins, hardwired connections were generally used to provide audio to various points of consumption. For example, an audio entertainment system may rely on a storage, e.g., a serving computing environment, to provide audio to passengers in various seating locations, who may then select audio to consume based on selection of a channel. In such systems, the distribution of audio was at the discretion of the system designer.

In systems and methods according to present principles, endpoints, e.g., consumption points or consumption locations, e.g., crew or passenger seats or other screen or audio/video input and output locations, may be enabled to control audio distribution and in some implementations even further enabled to allow a coupling to a source of audio, thereby allowing the end-user location to provide audio to one or more other endpoints or consumption points.

Systems and methods according to present principles may be enabled to accept audio inputs from, e.g., remote mobile devices, and in some cases the remote mobile device may be enabled to control certain aspects of the distribution and multiplexing. In essence, a crosspoint switch is located at every endpoint, so a passenger with a mobile device such as a smartphone, tablet, phablet, laptop, mp3 player, or the like, could be the source of audio throughout an aircraft.

In one implementation, sources of audio are received from every location, and the same are controlled by software to be enabled, or not enabled, at each endpoint location. That is, each endpoint location may be associated with one or more permissions, which allow the endpoint location to receive audio at that location. For example, passengers traveling together may be enabled to share audio from one source, but may be prohibited from hearing cockpit audio except at times designated by the pilot. It will be understood that video may also be shared using systems and methods according to present principles. Crew may be enabled to hear cockpit audio. A third member of the flight crew may be enabled to control audio distribution throughout the aircraft, from a location in the cockpit or elsewhere.

In general, all audio devices may be potential sources of audio, as may all microphones, e.g., those corresponding to the pilot, copilot, flight attendants, and so on. All radios may be sources, all entertainment and music systems may be sources, and so on.

In some cases sound sources may be considered to be stationary, e.g., cockpit audio, aircraft radios, aircraft entertainment systems, and so on, as the same are innate to the aircraft. In other cases sound sources may be considered to be mobile or temporary, e.g., passenger devices, e.g., mobile phones, portable MP3 players, tablet computers and laptops, and so on. And in some implementations, a passenger, crew member, or flight crew member may be enabled to control at least one stationary multimedia source and at least one mobile multimedia source. In one sense, in many implementations, source information/data is distributed such that the same can be mixed locally. As noted, a permissions system may be employed which is controllable by software commands distributed on the same bus.

As noted above, all of the above notations of "audio" may also apply to video and multimedia content.

Figure 11:
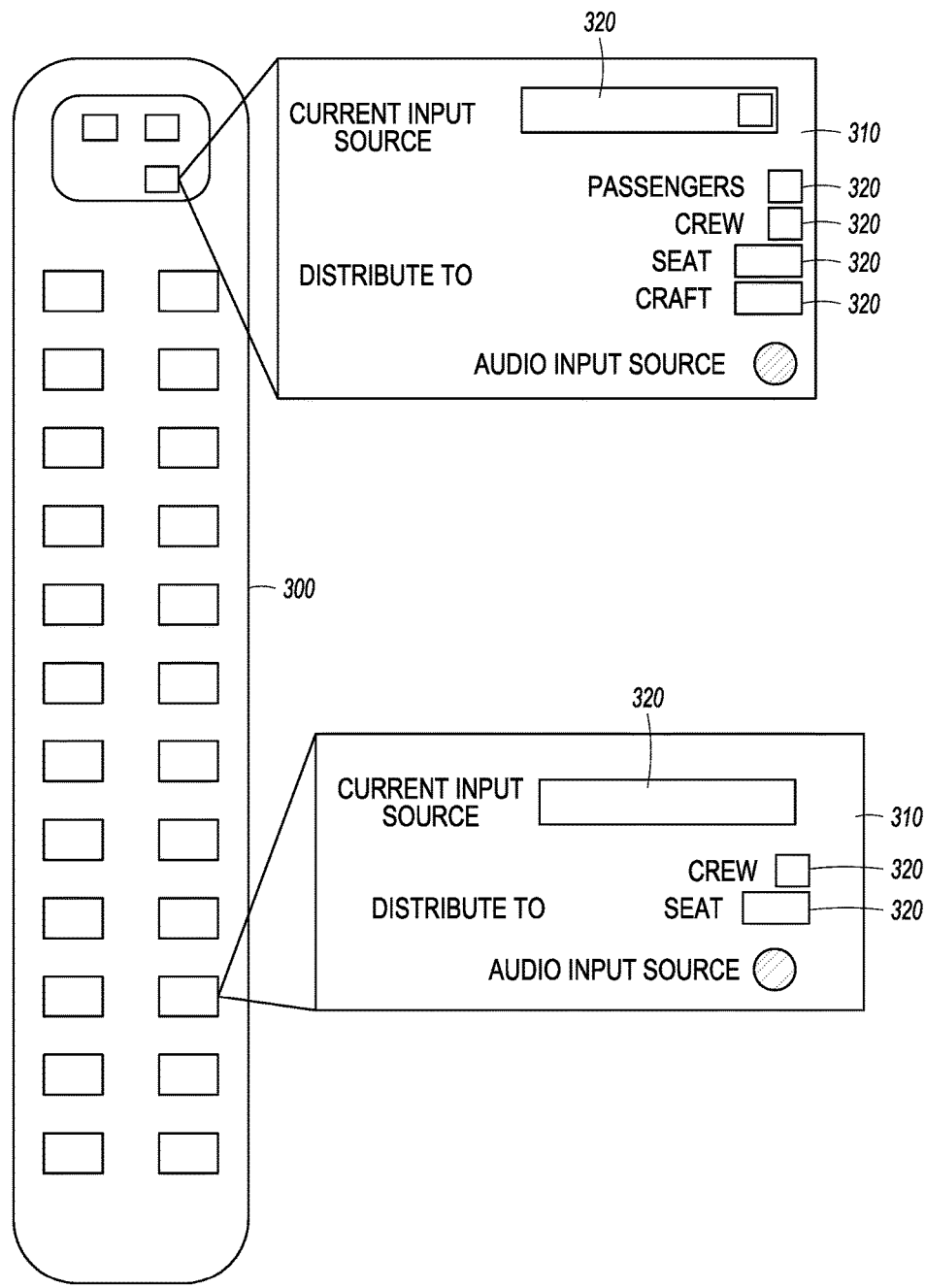
FIG. 11 shows one example of a user interface that may be employed to select the input source of the audio or other content and the endpoints to which the content should be distributed over an audio distribution system in an aircraft.

FIG. 11 shows one example of a user interface device 300 that may be employed to select the input source of the audio or other content and the endpoints to which the content should be distributed. As shown, the user interface may display on a screen 310 various fields 320 that may be populated by the user to select the content source and the endpoint to which the content from that source is to be distributed.

The various systems and methods described herein may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or wi-fi—connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where avionics controls and information systems are contemplated, the plural inputs may allow plural users to input relevant data at the same time.

What is claimed is:

1. A flight management system for controlling navigation of an aircraft, comprising: a path guidance panel having at least one mode selector for allowing user selection of guidance mode in which the aircraft is to operate; at least one display device having rendered thereon a navigational map; and a processor that receives aircraft data from one or more aircraft components, at least one of the aircraft components being a guidance system, the processor being configured to use information obtained from the guidance system to cause the at least one display device to render on the navigational map a current flight plan path that is the aircraft is following, the processor being further configured to cause the at least one display device to render on the navigational map a current location of the aircraft and wherein the current location of the aircraft deviates from the current flight plan path, the processor being further configured to cause the at least one display device to render on the navigational map dynamically changeable aircraft heading commands received from a user that cause the aircraft to rejoin the current flight plan path.

* * * * *